United States Patent [19]

Sengoku

[11] 4,389,069
[45] Jun. 21, 1983

[54] METHOD OF AND A DEVICE FOR FIXING A WINDOW MOLDING ONTO A WINDOWPANE

[75] Inventor: Ikuo Sengoku, Toyota, Japan

[73] Assignee: Toyota Jidosha Kogyo Kabushiki Kaisha, Toyota, Japan

[21] Appl. No.: 250,916

[22] Filed: Apr. 3, 1981

[30] Foreign Application Priority Data

Nov. 5, 1980 [JP] Japan .................. 55/154569

[51] Int. Cl.³ .............................. B60J 1/00
[52] U.S. Cl. .................. 296/206; 296/84 D; 296/93; 52/208; 52/718
[58] Field of Search ............ 296/84 R, 84 D, 93, 296/206; 52/208, 718, 716, 717, 397

[56] References Cited

U.S. PATENT DOCUMENTS

| | | | |
|---|---|---|---|
| 3,245,182 | 4/1966 | Zierold | 296/84 R |
| 4,168,859 | 9/1979 | Inamoto | 296/84 R |
| 4,262,960 | 4/1981 | Fifer | 296/84 R |
| 4,278,286 | 7/1981 | Kiba | 296/93 |

Primary Examiner—Robert R. Song
Attorney, Agent, or Firm—Parkhurst & Oliff

[57] ABSTRACT

A windowpane assembly comprising a molding clip inserted between the circumferential end face of the windowpane and the riser portion of the fillister formed on a vehicle body for fixing a window molding onto the windowpane. The molding clip comprises a holding portion fitted into the window molding, a pair of elastic wings, and a pair of latch claws. Before the molding clip is inserted between the windowpane and the riser portion of the fillister, the elastic wings are engaged with the corresponding latch claws. When the molding clip is inserted between the windowpane and the riser portion of the fillister, the elastic wings are automatically disengaged from the latch claws and come into engagement with the rear face of the windowpane.

24 Claims, 16 Drawing Figures

METHOD OF AND A DEVICE FOR FIXING A WINDOW MOLDING ONTO A WINDOWPANE

DESCRIPTION OF THE INVENTION

The present invention relates to a method of and a device for fixing a windowpane, such as a windshield or a rear window of a vehicle, onto the body of a vehicle.

As illustrated in FIG. 1, in, for example, a windshield of a motor vehicle, the periphery of the windshield 1 is covered by a decorative window molding 2, and a plurality of window molding fixing devices 3 is attached onto the rear of the window molding 2. FIG. 2 illustrates a cross-section of such a conventional window molding fixing device 3. Referring to FIG. 2, the body panel 4 of a vehicle has a fillister 5 formed thereon for receiving the windshield 1, and the periphery of the windshield 1 is stuck onto the bottom wall 6 of the fillister 5 by means of an adhesive packing material 7. On the other hand, a T-shaped stud 9, having an enlarged head, is welded onto the riser portion 8 of the fillister 5, and a molding clip 10, made of a synthetic resin, is fitted onto the stud 9. As illustrated in FIG. 3, the molding clip 10 has an elastic deformable portion 11 at the central portion thereof, and an increased diameter hole 12 and a reduced diameter hole 13, which are interconnected to each other, are formed on the elastic deformable portion 11. The molding clip 10 is secured onto the riser portion 8 of the fillister 5 as illustrated in FIG. 2 in such a way that, firstly, the increased diameter hole 12 of the molding clip 10 is inserted into the stud 9 and, then, the reduced diameter hole 13 of the molding clip 10 is fitted onto the stud 9. After this, the outer peripheral portion 14 of the molding clip 10 is fitted into the underside of the claw 15 by striking the window molding 2 with a hammer and, thus, the window molding 2 is fixed onto the windshield 1.

However, in such a conventional window molding fixing device 3, since it is necessary to weld a plurality of the studs 9 onto the riser portion 8 of the fillister 5, it takes a long time for the welding operation and, as a result, a problem occurs in that the manufacturing time period and cost will be increased. In addition, the window molding 2 is secured into the molding clip 10 in such a way that the outer peripheral portion 14 of the molding clip 10 is fitted into the underside of the claw 15 by striking the window molding 2 with a hammer, as mentioned above. Consequently, at this time, there is a possibility the painted surface of the body panel 4 will be damaged by the window molding.

An object of the present invention is to provide a window molding fixing method and window molding fixing device which are capable of easily and assuredly fixing the window molding onto a windowpane without using the T-shaped stud and are free from the occurrence of damage of the painted surface of the body panel.

According to the present invention, there is provided a method of fixing a window molding onto a windowpane arranged in an L-shaped cross-sectional fillister of a vehicle body, which extends along an outer periphery of the windowpane and comprises a riser portion extending inwardly from the vehicle body, and a bottom portion extending substantially parallel to the vehicle body from an inner end of said riser portion. The windowpane is stuck onto the bottom portion by means of an adhesive material. A gap formed between the riser portion and the outer periphery of the windowpane is covered by the window molding which has a substantially C-shaped cross-section. The method of fixing a window molding onto a windowpane utilizes a molding clip which comprises a holding portion engageable with the C-shaped cross-section of the window molding, an elastic wing member intended to resiliently abut against the outer periphery of the windowpane within the gap, and a claw member engageable with said elastic wing member for maintaining said elastic wing member in a compressed state to accumulate the elastic force of said elastic wing member. This method is carried out by the following steps of: securing the holding portion of said molding clip into the C-shaped cross-section of said window molding; engaging said elastic wing member with said claw member to maintain said elastic wing member in the compressed state; inserting said molding clip supported by said window molding into the gap; and automatically disengaging said elastic wing member from said claw member and causing said elastic wing member to resiliently abut aginst the outer periphery of said windowpane.

In addition, according to the present invention, there is provided a windowpane assembly of a vehicle, which has a window molding and a windowpane arranged in an L-shaped cross-sectional fillister of a vehicle body. The fillister extends along an outer periphery of the windowpane and comprises a riser portion which extends inwardly from the vehicle body, and a bottom portion which extends substantially parallel to the vehicle body from an inner end of said riser portion. The windowpane is stuck onto the bottom portion by means of an adhesive material. A gap formed between the riser portion and the outer periphery of the windowpane is covered by the window molding which has a substantially C-shaped cross-section. The windowpane assembly has a molding clip inserted into the gap for fixing the window molding onto the windowpane. This molding clip comprises: a holding portion engageable with the C-shaped cross-section of said window molding; an elastic wing member intended to resiliently abut against the outer periphery of the windowpane within the gap; latch means engageable with said elastic wing member for maintaining said elastic wing member in a compressed state to accumlate the elastic force of said elastic wing member, and; disengaging means for disengaging said elastic wing member from said latch means and causing said elastic wing member to resiliently abut against the outer periphery of said windowpane.

The present invention may be more fully understood from the description of preferred embodiments of the invention set forth below, together with the accompanying drawings.

DESCRIPTION OF PREFERRED EMBODIMENTS

Figure 1:
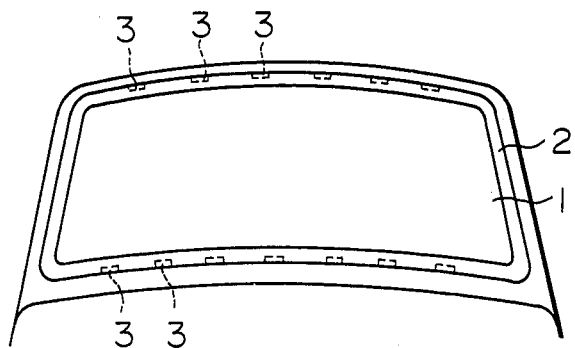
FIG. 1 is a front view of a windshield of a vehicle.
Figure 2:
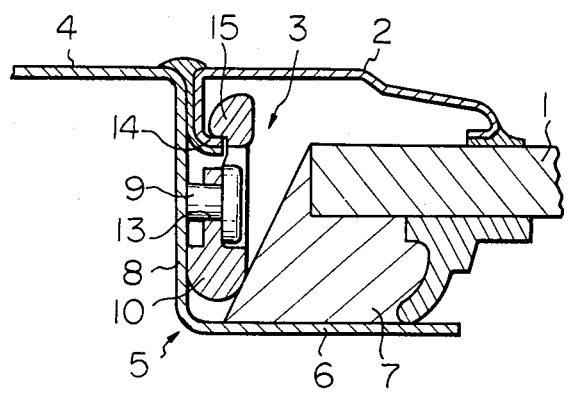
FIG. 2 is a cross-sectional side view of a conventional window molding fixing device.
Figure 3:
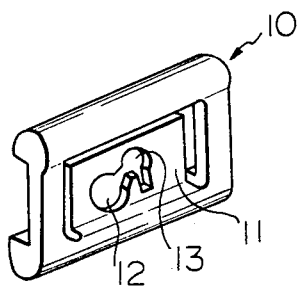
FIG. 3 is a perspective view of the clip illustrated in FIG. 2.
Figure 4:
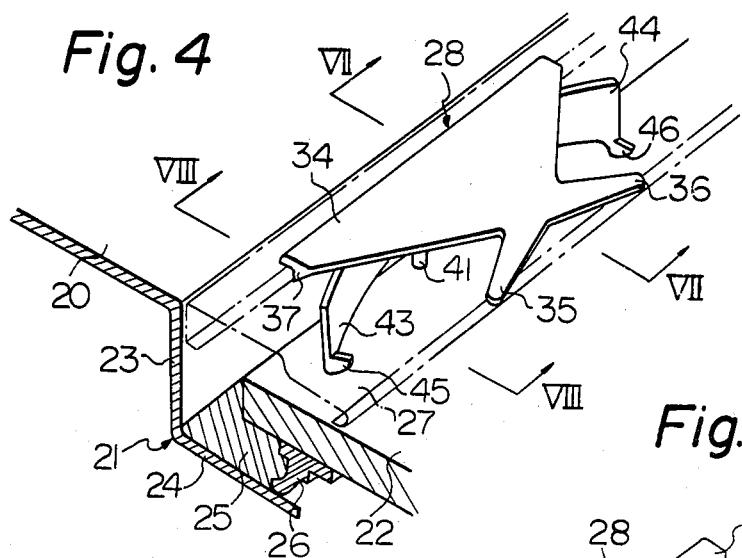
FIG. 4 is a perspective view of an embodiment of a window molding fixing device according to the present invention.

Referring to FIG. 4, 20 designates a body panel exposed to the exterior of a vehicle, and 21 a fillister having an L-shaped cross-section for receiving a windowpane 22 therein. The fillister 21 comprises a riser portion 23 extending inwardly from the edge of the body panel 20 and substantially perpendicular to the body panel 20, and a bottom wall portion 24 extending from the inner end of the riser portion 23 parallel to the body panel 20. The windowpane 22 is stuck onto the bottom wall portion 24 by means of an adhesive packing material 25 which has a resiliency when it is hardened. In addition, a dam member 26 is mounted on the rear face of the windowpane 22 for preventing the outflow of the adhesive packing material 25 when the windowpane 22 is stuck onto the bottom wall portion 24 by using the adhesive packing material 25. FIG. 4 illustrates the interior of a window molding 27 having a generally C-shaped cross-section and the window molding 27 is depicted by a line of short and long dashes.

Figure 5:
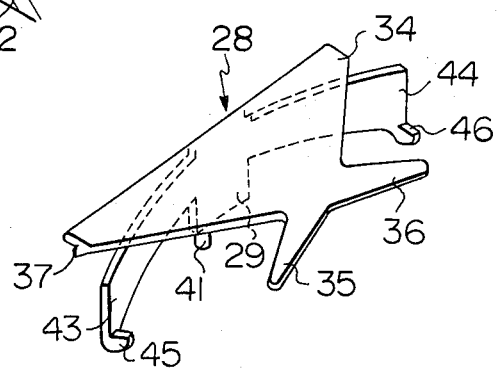
FIG. 5 is a perspective view of the molding clip illustrated in FIG. 4.
Figure 6:
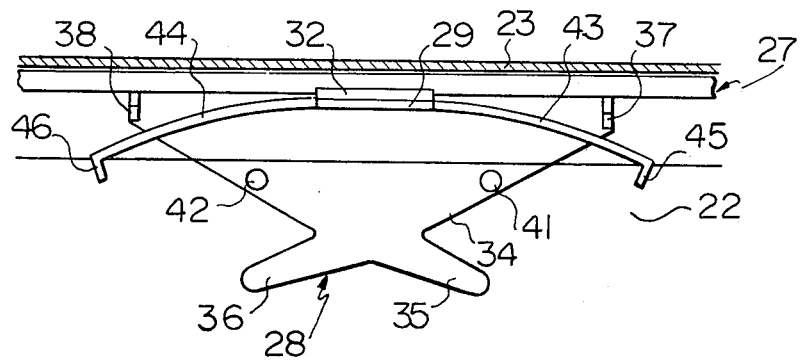
FIG. 6 is a bottom view of FIG. 4.
Figure 7:
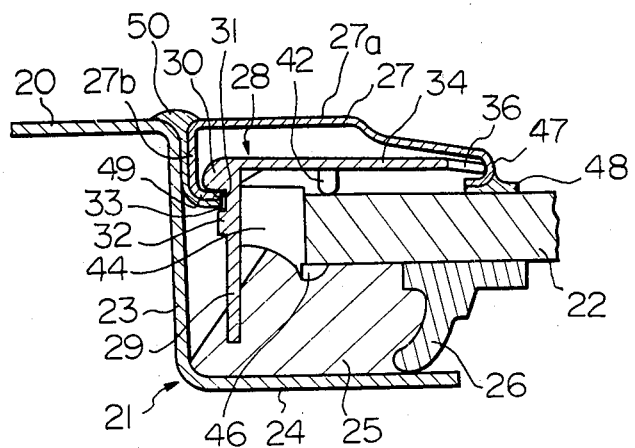
FIG. 7 is a cross-sectional side view taken along the line VII—VII in FIG. 4.
Figure 8:
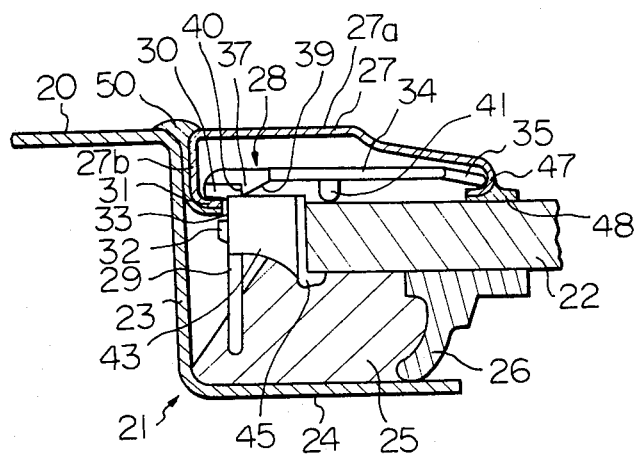
FIG. 8 is a cross-sectional side view taken along the line VIII—VIII in FIG. 4.

FIGS. 4, 6, 7 and 8 illustrate the state wherein the window molding 27 is fixed onto the windowpane 22 by means of a molding clip 28 according to the present invention, and FIG. 5 illustrates only the molding clip 28 of FIG. 4. Referring to FIGS. 4 through 8, the molding clip 28 comprises a rectangular shaped flat central base portion 29 extending substantially parallel to the riser portion 23, and a projection 30, projecting towards the riser portion 23, is formed in one piece on the upper end of the central base portion 29. As illustrated in FIGS. 7 and 8, the projection 30 has a flat lower face 31 extending substantially perpendicular to the central base portion 29, and another projection 32, slightly spaced from the projection 30, is formed on the central base portion 29 beneath the flat lower face 31 of the projection 30. Consequently, a groove 33, having a U-shaped cross-section and extending parallel to the periphery of the windowpane 22, is formed between the projections 30 and 32. As illustrated in FIGS. 4 through 8, the molding clip 28 comprises a flat holding portion 34 having a substantially isosceles triangular shape, and the holding portion 34 has a pair of elastic horns 35, 36 formed in one piece thereon and extending outwardly from the apex of the isosceles triangle. In addition, the holding portion 34 is connected to the central base portion 29 at the center of the base of the isosceles triangle so that the holding portion 34 extends substantially perpendicular to the central base portion 29 towards the windowpane 22. Furthermore the holding portion 34 has a pair of downwardly extending latch claws 37, 38, each being arranged at the corresponding end of the base of the isosceles triangle. As illustrated in FIG. 8, each of the claws 37, 38 comprises a gently inclined side wall 39 located near the windowpane 22, and a vertically extending flat side wall 40 located near the riser portion 23 and extending perpendicular to the holding portion 34. Downwardly projecting projections 41 and 42 are formed on the rear face of the holding portion 34 located approximately at the center position between the apex of the isosceles triangle and the claws 37 and 38, respectively. As illustrated in FIG. 6, it is necessary to form the projections 41, 42 so that they are located within the region of the windowpane 22.

As illustrated in FIGS. 4 through 8, the central base portion 29 has a pair of elastic wings 43, 44 formed in one piece on the opposed side peripheries thereof and extending outward, while curving, so that the elastic wings 43, 44 gradually approach the peripheral edge of the windowpane 22. The outer ends of the elastic wings 43, 44 project outwardly from the holding portion 34, and the top edges of the elastic wings 43, 44 extend substantially parallel to the holding portion 34. In addition, a pair of claws 45, 46, each projecting from the wings 43, 44 towards the windowpane 22, is formed on the lower portions of the outer ends of the wings 43, 44, respectively.

As illustrated in FIGS. 7 and 8, the window holding 27 comprises a front portion 27a extending substantially parallel to the windowpane 22 and exposed to the exterior of the vehicle, and a bending portion 27b extending downwardly from the outer circumferential edge of the front portion 27a and substantially perpendicular to the front portion 27a. The inner circumferential edge 47 of the front portion 27a of the window molding 27 is bent inward in the form of a C-shaped cross-section, and a rubber member 48 for protection is stuck onto the outer wall of the inner circumferential edge 47 of the front portion 27a. On the other hand, the lower edge portion 49 of the bending portion 27b of the window molding 27 is bent in the form of an L-shape cross-section, and a rubber member 50 for protection is stuck onto the outer wall of the bending portion 27b.

Figure 9:
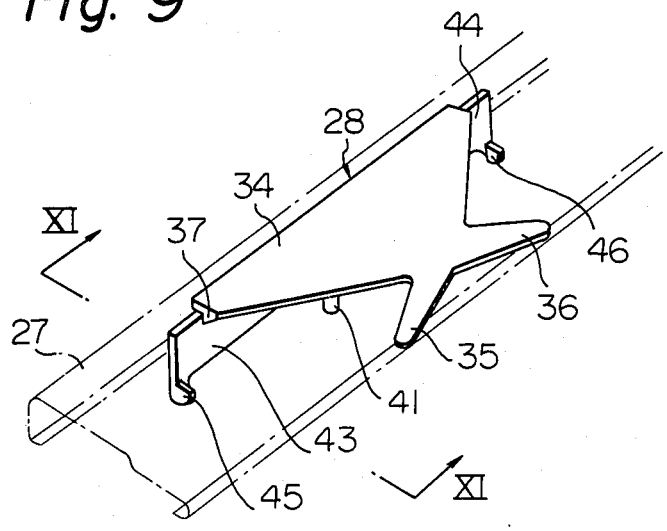
FIG. 9 is a perspective view of a molding clip fixed onto a window molding.
Figure 10:
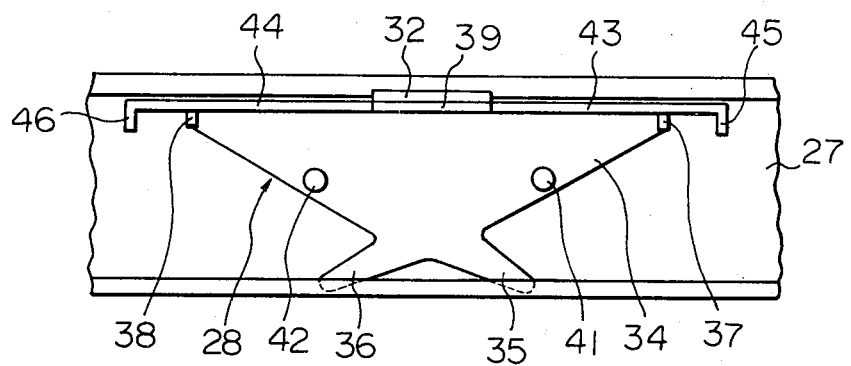
FIG. 10 is a bottom view of FIG. 9.
Figure 11:
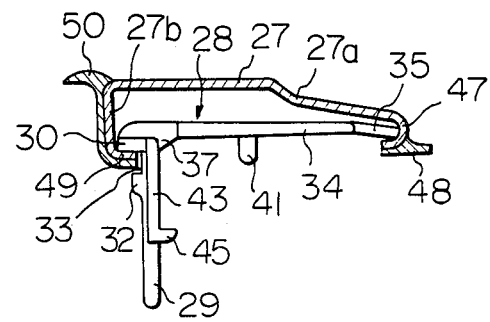
FIG. 11 is a cross-sectional side view taken along line XI—XI in FIG. 9.
Figure 12:
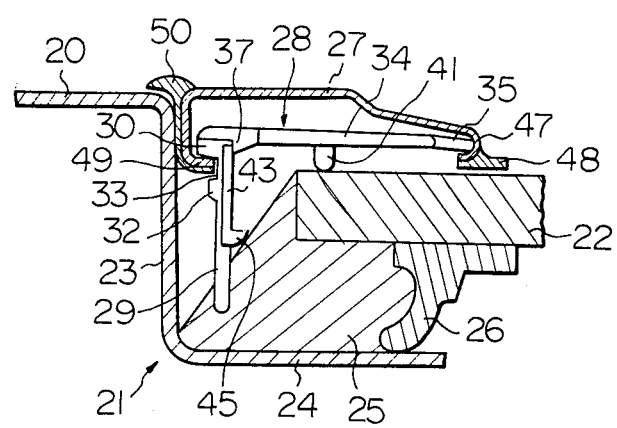
FIG. 12 is a cross-sectional side view illustrating the same cross-section as that of FIG. 8 and illustrating the initial stage of the insertion of the molding clip.

The windowpane 22 is stuck onto the bottom wall portion 24 of the fillister 21 by means of the adhesive packing material 25 as mentioned above and, then, the window molding 27 is fixed onto the windowpane 22 by means of the molding clip 28 before the adhesive packing material 25 is hardened. The elastic wings 43, 44 of the molding clip 28 are curved in the form of an arc in a free state as illustrated in FIG. 5. The elastic horns 35, 36 of the holding portion 34 of the molding clip 28 is fitted into the C-shaped cross-section of the inner circumferential edge 47 of the window molding 27 in such a free state. Then, the holding portion 34 of the molding clip 28 is inserted into the C-shaped cross-section of the window molding 27 while elastically deforming the elastic horns 35, 36, and the lower edge portion 49 of the window molding 27 is fitted into the groove 33 of the central base portion 29. After this, the elastic wings 43, 44 are pushed towards the corresponding claws 37, 38 against the elastic force of the elastic wings 43, 44 and, then, the elastic wings 43, 44 are engaged with the corresponding claws 37, 38 by a snapping action as illustrated in FIGS. 9 through 11. However, instead of engaging the elastic wings 43, 44 with the claws 37, 38 after the holding portion 34 of the molding clip 28 is inserted into the window molding 27 as mentioned above, the holding portion 34 of the molding clip 28 may be inserted into the window molding 27 after the elastic wings 43, 44 are engaged with the corresponding claws 37, 38. Then, the molding clip 28, supported by the window molding 27, is inserted between the circumferential end face of the windowpane 22 and the riser portion 23 of the fillister 21. At this time, firstly, the projections 41, 42 of the holding portion 34 abut against the front face of the windowpane 22 as illustrated in FIG. 12. After this, when the molding clip 28 is further pushed together with the window molding 27, since the lower edge portion 49 of the window molding 27 comes into engagement with the projection 32 and, thereby, the central base portion 29 is pushed down, the elastic wings 43, 44, connected to the central base portion 29, are pushed down. However, at this time, since the projections 41, 42 of the holding portion 34 abut against the windowpane 22, the holding portion 34 cannot move downward and, thus, the claws 37, 38 of the holding portion 34 also cannot move downwards. Consequently, when the molding clip 28 is further pushed down, the elastic wings 43, 44 are disengaged from the corresponding claws 37, 38 and, thus, the elastic wings 43, 44 are returned to a state as illustrated in FIG. 5 due to the elastic force of the elastic wings 43, 44. As a result of this, as illustrated in FIGS. 4, 6, 7 and 8, the elastic wings 43, 44 enter into the adhesive packing material 25 which has not been hardened, and the outer ends of the elastic wings 43, 44 resiliently abut against the circumferential end face of the windowpane 22. At this time, the claws 45, 46 of the elastic wings 43, 44 come into engagement with the periphery of the rear face of the windowpane 22. As a result of this, the window molding 27 is fixed onto the windowpane 22 by the claws 45, 46 of the elastic wings 43, 44.

Figure 13:
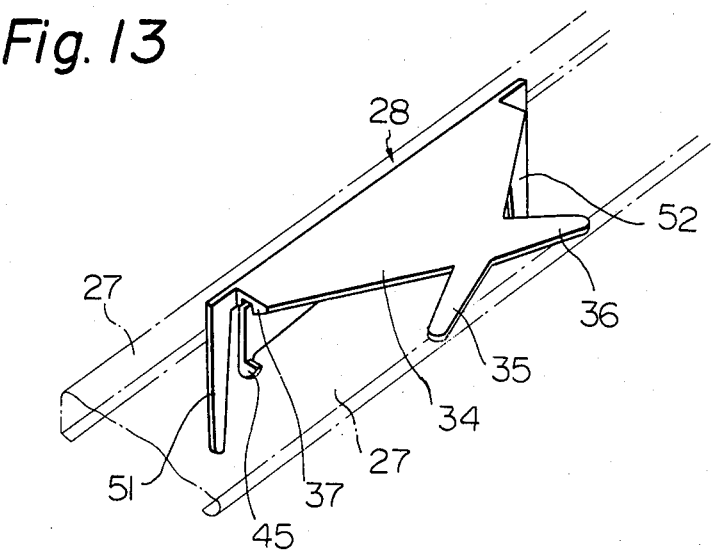
FIG. 13 is a perspective view of an alternative embodiment according to the present invention.
Figure 14:
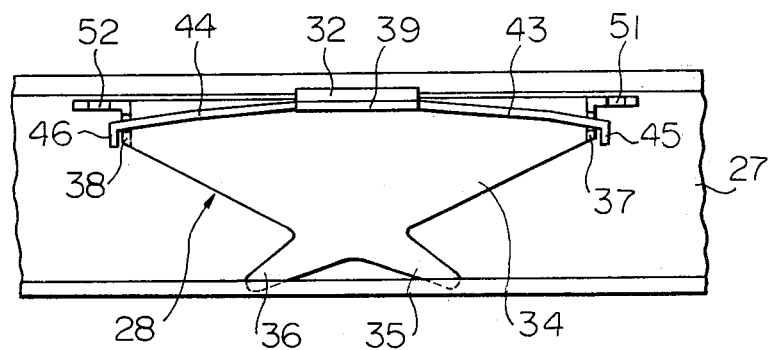
FIG. 14 is a bottom view of FIG. 13.
Figure 15:
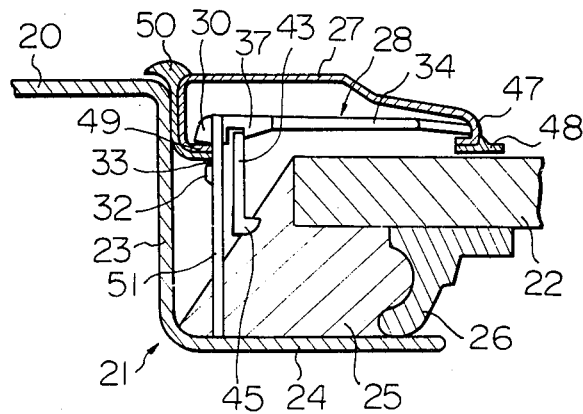
FIG. 15 is a cross-sectional side view of FIG. 13, illustrating the initial stage of the insertion of the molding clip.
Figure 16:
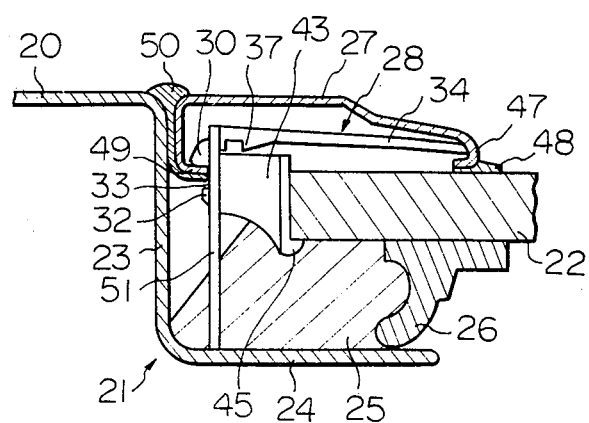
FIG. 16 is a cross-sectional side view of FIG. 13, illustrating the molding clip the insertion of which is completed.

FIGS. 13 through 16 illustrate an alternative embodiment. In FIGS. 13 through 16, similar components are indicated with the same reference numerals used in FIGS. 4 through 12. Referring to FIGS. 13 through 16, in this embodiment, the projections 41, 42, illustrated in FIGS. 4 through 12, are removed from the holding portion 34 and, instead of using such projections 41, 42, downwardly extending legs 51, 52 are formed in one piece on the opposed ends of the holding portion 34. In this embodiment, as in the same manner as described with reference to FIGS. 4 through 12, firstly, the elastic wings 43, 44 are engaged with the corresponding claws 37, 38 of the holding portion 34 after the holding member 34 of the molding clip 28 is fitted into the C-shaped cross-section of the window molding 27 as illustrated in FIGS. 13 and 14. Then, the molding clip 28, supported by the window molding 27, is inserted between the circumferential end face of the windowpane 22 and the riser portion 23 of the fillister 21 and, as a result, the legs 51, 52 of the holding portion 34 abut against the bottom wall portion 24 of the fillister 21 as illustrated in FIG. 15. After this, as the window molding 27 is pushed down, the elastic wings 43, 44 move downwards relative to the claws 37, 38 of the holding portion 34. Then, the elastic wings 43, 44 are disengaged from the corresponding claws 37, 38 and, thus, the elastic wings 43, 44 are returned to an initial curving state due to the elastic force of the elastic wings 43, 44. As a result of this, as illustrated in FIG. 16, the claws 45, 46 of the elastic wings 43, 44 come into engagement with the periphery of the rear face of the windowpane 22.

In the embodiments illustrated in FIGS. 4 through 12 and in FIGS. 13 through 16, the molding clip 28 is made, in one piece, of a synthetic resin, such as polyamide and polyacetal. In addition, in order to obtain a further higher elasticity, metallic spring plates may be embedded in the elastic wings 43, 44. Furthermore, the entirety of the molding clip 28 may be made, in one piece, of a metallic material.

According to the present invention, since it is not necessary to weld a T-shaped stud to the riser portion of the fillister, as in a prior art, it is possible to reduce the length of time which is necessary to assemble the window molding to the windowpane. In addition, after the molding clip is inserted between the circumferential end face of the windowpane and the riser portion of the fillister, the window molding can be fixed onto the windowpane by putting a slight force on the window molding, which force is necessary to disengage the elastic wings from the claws. Consequently, it is possible to prevent the painted surface of the body panel from being damaged when the window molding is fixed onto the windowpane. Furthermore, since the elastic force of the elastic wings has a slight influence on the force which is necessary to push the window molding into the fillister, it is possible to considerably strengthen the elastic force of the elastic wings and, thus, the force of holding the window molding can be increased as compared with that in a prior art. In addition, in the present invention, when the elastic wings are engaged with the claws, the transverse width of the molding clip becomes rather thin. Furthermore, when the elastic wings are disengaged from the claws of the holding portion of the molding clip, the claws of the elastic wings are able to come into engagement with the periphery of the rear face of the windowpane indpendently of the distance between the elastic wings and the circumferential end face of the windowpane. Consequently, even if a considerable irregularity in the distance between the circumferential end face of the windowpane and the riser portion of the fillister is present, it is possible to securely fix the window molding onto the windowpane.

While the invention has been described by reference to specific embodiments chosen for purposes of illustration, it should be apparent that numerous modifications could be made thereto by those skilled in the art without departing from the basic, concept and scope of the invention.

I claim:

1. A method of fixing a window molding onto a windowpane arranged in an L-shaped cross-sectional fillister of a vehicle body, which extends along an outer periphery of the windowpane and comprises a riser portion extending inwardly from the vehicle body, and a bottom portion extending substantially parallel to the vehicle body from an inner end of said riser portion, the windowpane being stuck onto the bottom portion by means of an adhesive material, a gap formed between the riser portion and the outer periphery of the windowpane being covered by the window molding which has a substantially C-shaped cross-section, said method comprising using a molding clip which comprises a holding portion engageable with the C-shaped cross-section of the window molding, elastic wing members intended to resiliently abut against the outer periphery of the windowpane within the gap, wherein the elastic wing members are connected to the bottom of said holding portion, claw members each engageable with a respective one of said elastic wing members for maintaining said elastic wing members in a compressed state to accumulate the elastic force of said elastic wing members, wherein said claw members are connected to the bottom of said holding portion, and projection means extending from the bottom of said holding portion, said method being carried out by the following steps of:

securing the holding portion of said molding clip into the C-shaped cross-section of said window molding;

engaging each of said claw members with the respective one of said elastic wing members to maintain said elastic wing members in the compressed state;

inserting said molding clip secured in said window molding into the gap;

pressing downwardly on said molding clip so that said projection means abut against a peripheral front face of said windowpane; and applying further pressure to said molding clip so that said elastic wing members are automatically disengaged from said claw members and said elastic wing members are caused to resiliently abut against the outer periphery of said windowpane.

2. A method as claimed in claim 1, wherein said window molding has opposed end portions, and the holding portion of said molding clip comes into engagement with said opposed end portions.

3. A method as claimed in claim 2, wherein the holding portion of said molding clip resiliently engages at least one of the opposed end portions of said window molding.

4. A method as claimed in claim 1, wherein, after said elastic wing members are disengaged from said claw members, said elastic wing members come into engagement with a peripheral rear face of said windowpane.

5. A method as claimed in claim 1, wherein, after said elastic wing members are disengaged from said claw members, said elastic wing members abut against a circumferential end face formed on the outer periphery of said windowpane.

6. A method as claimed in claim 1, wherein said elastic wing members resiliently abut against the outer periphery of said windowpane due to the elastic force of said elastic wing members.

7. A method as claimed in claim 6, wherein after said elastic wing members are disengaged from said claw members, said elastic wing members move towards the outer periphery of said windowpane on each side of the center of said molding clip.

8. A method as claimed in claim 1, wherein, after said elastic wing members are disengaged from said claw members, said elastic wing members abut against the outer periphery of said windowpane at two points on the outer periphery of said windowpane.

9. A method as claimed in claim 1, wherein said claw members mechanically engage said elastic wing members.

10. A method as claimed in claim 9, wherein, when said molding clip is inserted into the gap, a portion of said molding clip is deformed, and said elastic wing members become disengaged from said claw members due to the deformation of this portion of said molding clip.

11. A method as claimed in claim 10, wherein, when said molding clip is inserted into the gap, the holding portion of said molding clip is deformed.

12. A method as claimed in claim 1, wherein said elastic wing members are disengaged from said claw members immediately before the insertion of said molding clip is completed.

13. A windowpane assembly of a vehicle, which has a window molding and a windowpane arranged in an L-shaped cross-sectional fillister of a vehicle body, said fillister extending along an outer periphery of the windowpane and comprising a riser portion which extends inwardly from the vehicle body, and a bottom portion which extends substantially parallel to the vehicle body from an inner end of said riser portion, the windowpane being stuck onto the bottom portion by means of an adhesive material, a gap formed between the riser portion and the outer periphery of the windowpane being covered by the window molding which has a substantially C-shaped cross-section, said device having a molding clip inserted into the gap for fixing the window molding onto the windowpane, said molding clip comprising:

a holding portion engageable with the C-shaped cross-section of said window molding;

elastic wing members intended to resiliently abut against the outer periphery of the windowpane within the gap, said elastic wing members being connected to the bottom of said holding portion;

claw members each engageable with a respective one of said elastic wing members for maintaining said elastic wing members in a compressed state to accumulate the elastic force of said elastic wing members, wherein said claw members are connected to the bottom of said holding portion; and projection means extending from the bottom of said holding portion, wherein said elastic wing members, said claw members, and said projection means are attached to said holding portion so that when said molding clip is engaged with said window molding and pressed toward the windowpane, the projection means abut against a front face of the windowpane and when further pressure is applied to said molding clip, the elastic wing members are disengaged from said claw members and abut against the outer periphery of said windowpane.

14. A windowpane assembly as claimed in claim 13, wherein the C-shaped cross-section of said window molding has opposed end portions, and the holding portion of said molding clip has a pair of engaging ends, each being in engagement with the corresponding one of the opposed end portions of said window molding.

15. A windowpane assembly as claimed in claim 14, wherein at least one of said engaging ends has elasticity.

16. A windowpane assembly as claimed in claim 13, wherein said elastic wing members have at least one claw which is engageable with a peripheral rear face of said windowpane.

17. A windowpane assembly as claimed in claim 16, wherein said elastic wing members have at least one end portion which is able to resiliently abut against a circumferential end face formed on the outer periphery of said windowpane.

18. A windowpane assembly as claimed in claim 13, wherein said elastic wing members are made of an elastic material.

19. A windowpane assembly as claimed in claim 18, wherein said elastic wing members comprise a pair of elastic wings extending in an opposite direction relative to the center of said molding clip.

20. A windowpane assembly as claimed in claim 19, wherein each of said elastic wings has an outer end which is engageable with the outer periphery of said windowpane.

21. A windowpane assembly as claimed in claim 13, wherein said molding clip is formed in one piece.

22. A windowpane assembly as claimed in claim 21, wherein said molding clip is made of a synthetic resin.

23. A windowpane assembly as claimed in claim 22, wherein said molding clip has a portion in which a metallic plate is embedded.

24. A windowpane assembly as claimed in claim 21, wherein said molding clip is made of a metallic material.

* * * * *